United States Patent
Morikazu et al.

(10) Patent No.: US 9,174,306 B2
(45) Date of Patent: Nov. 3, 2015

(54) LASER PROCESSING METHOD FOR NONLINEAR CRYSTAL SUBSTRATE

(75) Inventors: Hiroshi Morikazu, Ota-Ku (JP); Yoko Nishino, Ota-Ku (JP)

(73) Assignee: Disco Corporation, Tokyo (JP)

( * ) Notice: Subject to any disclaimer, the term of this patent is extended or adjusted under 35 U.S.C. 154(b) by 835 days.

(21) Appl. No.: 13/413,827

(22) Filed: Mar. 7, 2012

(65) Prior Publication Data

US 2012/0234809 A1    Sep. 20, 2012

(30) Foreign Application Priority Data

Mar. 17, 2011    (JP) .................................. 2011-058861

(51) Int. Cl.
*B23K 26/00* (2014.01)
*B23K 26/06* (2014.01)
*B23K 26/40* (2014.01)

(52) U.S. Cl.
CPC ......... *B23K 26/0635* (2013.01); *B23K 26/4075* (2013.01); *B23K 2201/40* (2013.01)

(58) Field of Classification Search
CPC ............. B23K 26/0635; B23K 26/367; B23K 26/407; B23K 26/4075; B23K 26/408; B23K 26/409; B23K 2201/40

USPC .............. 219/121.6, 121.61, 121.65–121.69, 219/121.72; 438/463
See application file for complete search history.

(56) References Cited

U.S. PATENT DOCUMENTS

2004/0232124 A1* 11/2004 Nagai et al. ............... 219/121.72
2005/0158968 A1*  7/2005 Nagai ........................... 438/464
2005/0173387 A1*  8/2005 Fukuyo et al. ........... 219/121.67

FOREIGN PATENT DOCUMENTS

JP        2002-192370      7/2002
JP        2002-372641      12/2002

* cited by examiner

*Primary Examiner* — Dana Ross
*Assistant Examiner* — Brandon Harvey
(74) *Attorney, Agent, or Firm* — Greer Burns & Crain, Ltd.

(57) ABSTRACT

A laser processing method for a nonlinear crystal substrate having a plurality of crossing division lines which includes the step of applying a pulsed laser beam to a work surface of the nonlinear crystal substrate along the division lines to thereby form a plurality of laser processed grooves on the work surface along the division lines. The pulse width of the pulsed laser beam is set to 200 ps or less and the repetition frequency of the pulsed laser beam is set to 50 kHz or less.

14 Claims, 7 Drawing Sheets

LASER PROCESSING METHOD FOR NONLINEAR CRYSTAL SUBSTRATE

BACKGROUND OF THE INVENTION

1. Field of the Invention

The present invention relates to a laser processing method for forming a laser processed groove on a nonlinear crystal substrate of lithium tantalate ($LiTaO_3$) or lithium niobate ($LiNbO_3$), for example.

2. Description of the Related Art

In a semiconductor device fabrication process, a plurality of crossing division lines are formed on the front side of a substantially disk-shaped silicon substrate to thereby partition a plurality of regions where devices such as ICs and LSIs are respectively formed, thus forming a semiconductor wafer having the devices partitioned by the division lines on the front side. The semiconductor wafer is cut along the division lines to thereby divide the regions where the devices are formed from each other, thus obtaining the individual devices. Further, an optical device wafer is provided by forming gallium nitride compound semiconductors or the like on the front side of a sapphire substrate or a silicon carbide substrate. The optical device wafer is also cut along the division lines to obtain individual optical devices divided from each other, such as light emitting diodes and laser diodes, which are widely used in electric equipment.

As a method of dividing such a wafer along the division lines, there has been proposed a method including the steps of applying a pulsed laser beam having an absorption wavelength to the wafer along the division lines to thereby form laser processed grooves as a break start point on the wafer along the division lines and next applying an external force to the wafer along the division lines where the laser processed grooves as the break start point are formed, thereby breaking the wafer along the laser processed grooves (see Japanese Patent No. 3408805, for example).

SUMMARY OF THE INVENTION

In recent years, a SAW (Surface Acoustic Wave) device has been developed and put into practical use as an oscillator and a heat sensing device, for example. Such SAW devices are formed on a nonlinear crystal substrate of lithium tantalate ($LiTaO_3$) or lithium niobate ($LiNbO_3$), for example. When a laser beam is applied to the nonlinear crystal substrate along the division lines, there arises a problem such that cracks are generated in the nonlinear crystal substrate having a complicated crystal structure, causing a difficulty in quality assurance for the SAW devices.

It is therefore an object of the present invention to provide a laser processing method for a nonlinear crystal substrate of lithium tantalate ($LiTaO_3$) or lithium niobate ($LiNbO_3$), for example, which can form laser processed grooves on the substrate without generating the cracks.

In accordance with an aspect of the present invention, there is provided a laser processing method for a nonlinear crystal substrate having a plurality of crossing division lines, including the step of applying a pulsed laser beam to a work surface of the nonlinear crystal substrate along the division lines to thereby form a plurality of laser processed grooves on the work surface along the division lines, wherein the pulse width of the pulsed laser beam is set to 200 ps or less and the repetition frequency of the pulsed laser beam is set to 50 kHz or less.

Preferably, the repetition frequency of the pulsed laser beam is set in the range of 25 to 50 kHz. Preferably, the wavelength of the pulsed laser beam is set to 550 nm or less.

In the laser processing method for the nonlinear crystal substrate according to the present invention, the pulse width of the pulsed laser beam to be applied to the nonlinear crystal substrate is set to 200 ps or less and the repetition frequency of this pulsed laser beam is set to 50 kHz or less. Accordingly, the laser processed grooves can be formed without generating the cracks. Further, by setting the repetition frequency of the pulsed laser beam to 25 to 50 kHz, the laser processed grooves can be formed on the nonlinear crystal substrate without reducing the processing efficiency and generating the cracks.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENT

Figure 1:
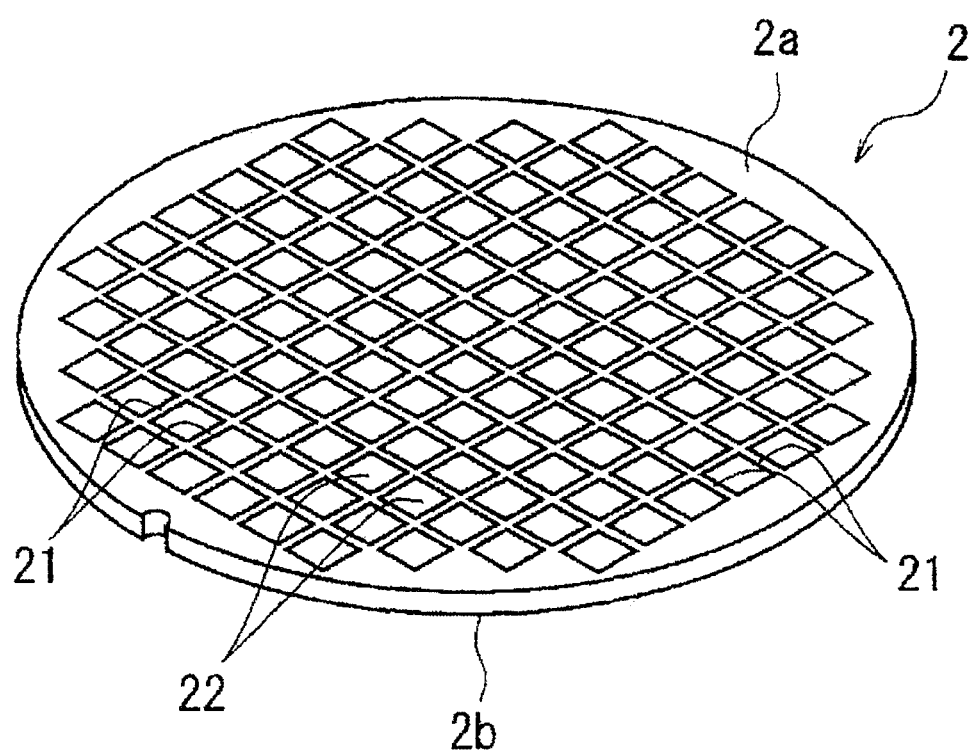
FIG. 1 is a perspective view showing a SAW device wafer to be processed by the laser processing method for the nonlinear crystal substrate according to the present invention.
Figure 2:
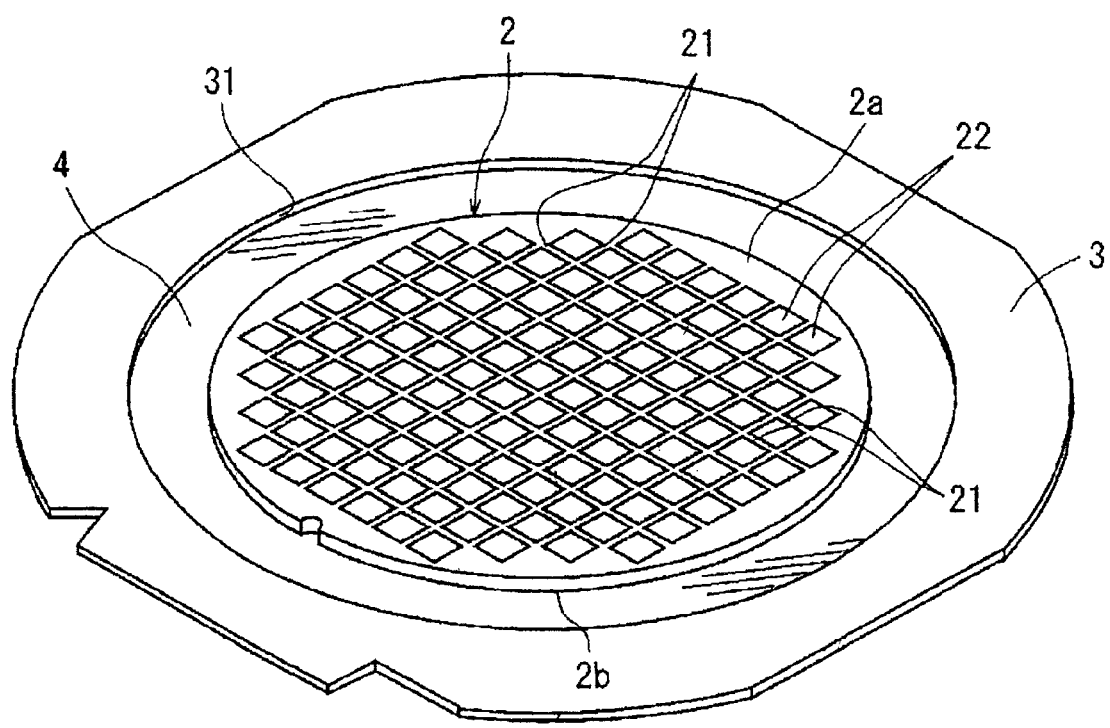
FIG. 2 is a perspective view showing a condition where the SAW device wafer is attached to an adhesive tape supported to an annular frame by performing a wafer attaching step in the laser processing method for the nonlinear crystal substrate according to the present invention.

A preferred embodiment of the laser processing method for the nonlinear crystal substrate according to the present invention will now be described in detail with reference to the attached drawings. FIG. 1 is a perspective view of a SAW (Surface Acoustic Wave) device wafer as a workpiece. The SAW device wafer 2 shown in FIG. 1 is formed from a nonlinear crystal substrate having a thickness of 100 μm, for example. The nonlinear crystal substrate is formed of lithium tantalate ($LiTaO_3$) or lithium niobate ($LiNbO_3$), for example. A plurality of crossing division lines 21 are formed on the front side 2a of the SAW device wafer 2 to thereby partition a plurality of rectangular regions where a plurality of SAW devices 22 are respectively formed. Prior to forming a laser processed groove on the front side 2a of the SAW device wafer 2 along each division line 21, the back side 2b of the SAW device wafer 2 is attached to the front side of an adhesive tape 4 supported on an annular frame 3 as shown in FIG. 2 (wafer attaching step). Accordingly, the front side 2a of the SAW device wafer 2 attached to the front side of the adhesive tape 4 is oriented upward.

After performing the wafer attaching step mentioned above, a laser processed groove forming step is performed in such a manner that a pulsed laser beam is applied to the front side 2a of the SAW device wafer 2 along the division lines 21 to thereby form a laser processed groove along each division line 21 on the SAW device wafer 2. This laser processed groove forming step is performed by using a laser processing apparatus 5 shown in FIG. 3 in the embodiment. The laser processing apparatus 5 shown in FIG. 3 includes a chuck table 51 for holding a workpiece, laser beam applying means 52 for applying a pulsed laser beam to the workpiece held on the chuck table 51, and imaging means 53 for imaging the workpiece held on the chuck table 51.

The chuck table 51 is so configured as to hold the workpiece on its upper surface as a holding surface under suction. The chuck table 51 is movable by feeding means (not shown) in a feeding direction shown by an arrow X in FIG. 3 and also movable by indexing means (not shown) in an indexing direction shown by an arrow Y in FIG. 3.

The laser beam applying means 52 includes a cylindrical casing 521 extending in a substantially horizontal direction. Although not shown, the casing 521 contains pulsed laser beam oscillating means including a pulsed laser beam oscillator and repetition frequency setting means. The laser beam applying means 52 further includes focusing means 522 mounted on the front end of the casing 521 for focusing the pulsed laser beam oscillated by the pulsed laser beam oscillating means. The imaging means 53 is mounted on the front end portion of the casing 521 of the laser beam applying means 52. The imaging means 53 is configured by optical means including a microscope and a CCD camera. An image signal output from the imaging means 53 is transmitted to control means (not shown).

Figure 3:
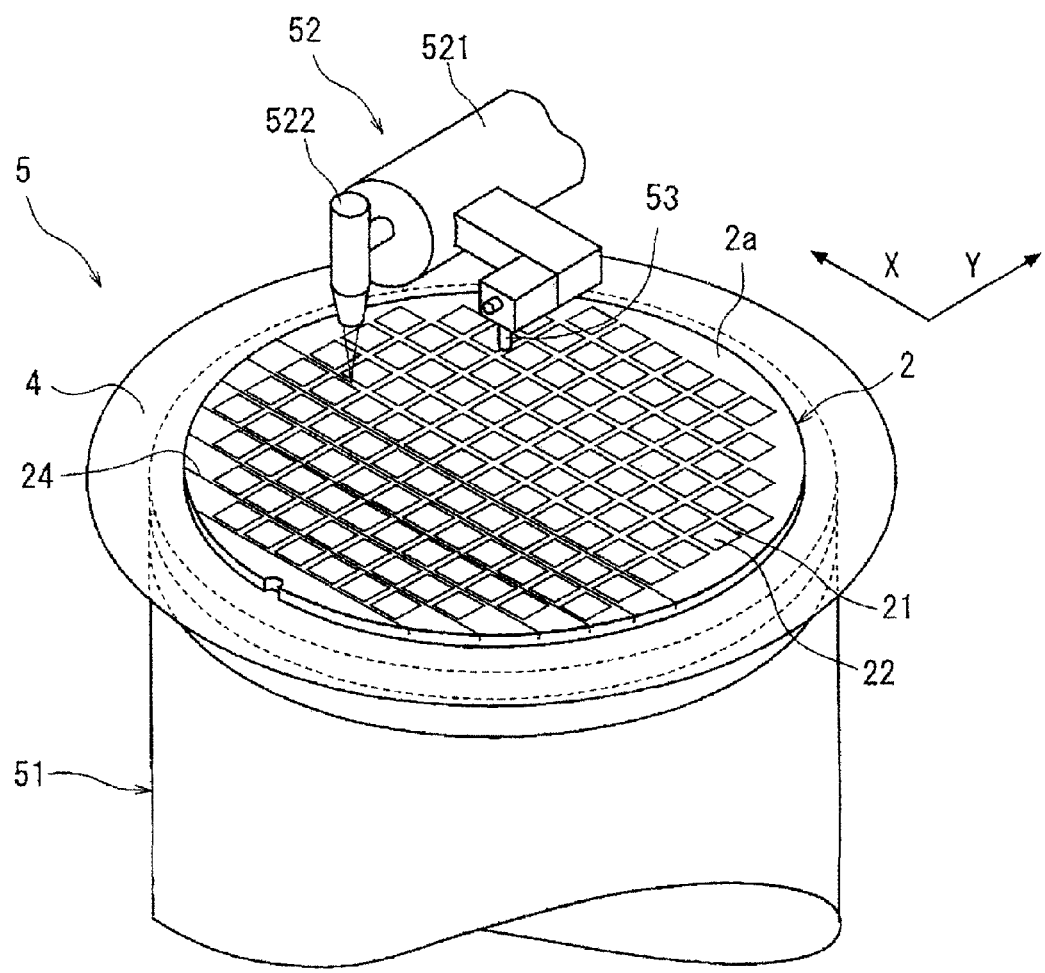
FIG. 3 is a perspective view showing an essential part of a laser processing apparatus for performing a laser processed groove forming step in the laser processing method for the nonlinear crystal substrate according to the present invention.
Figure 4A:
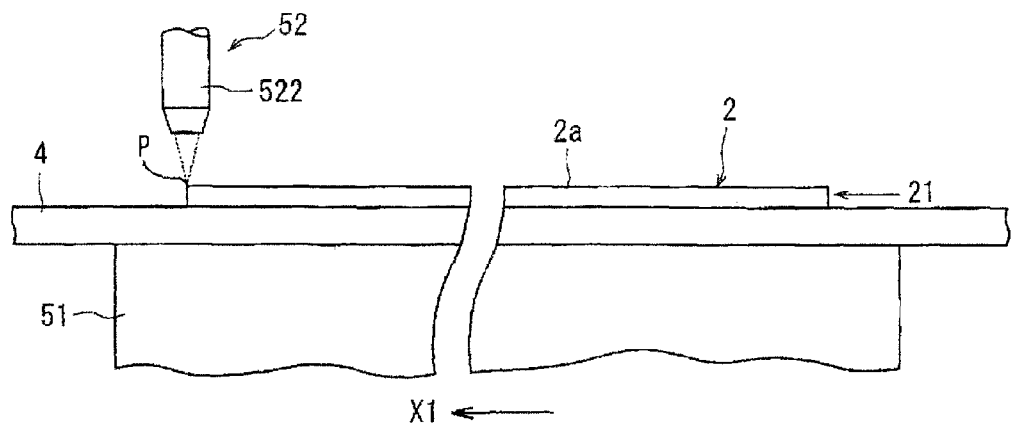
FIGS. 4A and 4B are sectional side views for illustrating the laser processed groove forming step in the laser processing method for the nonlinear crystal substrate according to the present invention.
Figure 4B:
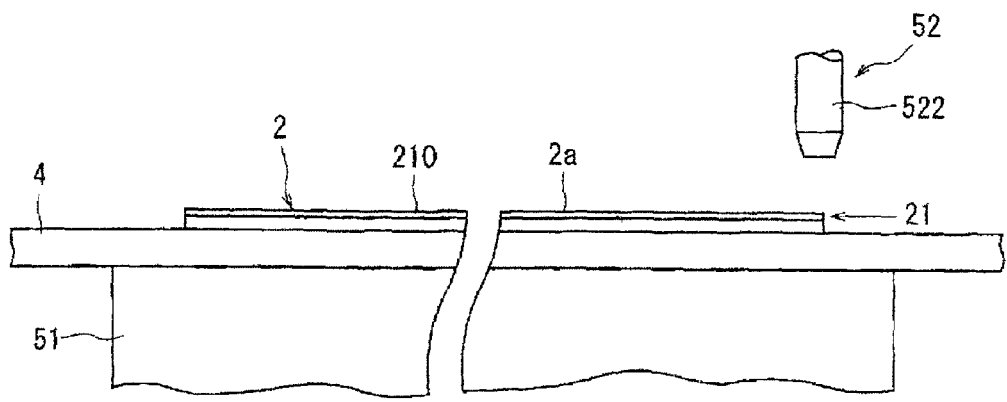

There will now be described a method of forming a laser processed groove along each division line 21 on the SAW device wafer 2 by using the laser processing apparatus 5 with reference to FIG. 3 and FIGS. 4A and 4B. In performing this method by using the laser processing apparatus 5, the SAW device wafer 2 attached to the adhesive tape 4 is first placed on the chuck table 51 of the laser processing apparatus 5 in the condition where the back side (lower surface) of the adhesive tape 4 comes into contact with the upper surface of the chuck table 51 as shown in FIG. 3. Thereafter, a suction means (not shown) is operated to hold the SAW device wafer 2 through the adhesive tape 4 on the chuck table 51 under suction (wafer holding step). Accordingly, the front side 2a of the SAW device wafer 2 held on the chuck table 51 is oriented upward. Although the annular frame 3 supporting the adhesive tape 4 is not shown in FIG. 3, the annular frame 3 is actually fixed to the chuck table 51 by any suitable frame holding means provided on the chuck table 51.

After performing the wafer holding step mentioned above, the chuck table 51 holding the SAW device wafer 2 is moved to a position directly below the imaging means 53 by operating the feeding means (not shown). In the condition where the chuck table 51 is positioned directly below the imaging means 53, an alignment operation is performed by the imaging means 53 and the control means (not shown) to detect a subject area of the SAW device wafer 2 to be laser-processed. More specifically, the imaging means 53 and the control means (not shown) perform image processing such as pattern matching for making the alignment of the division lines 21 extending in a first direction on the SAW device wafer 2 and the focusing means 522 of the laser beam applying means 52 for applying the laser beam along the division lines 21, thus performing the alignment of a laser beam applying position (alignment step). This alignment operation is performed similarly for the other division lines 21 extending in a second direction perpendicular to the first direction mentioned above on the SAW device wafer 2.

After performing the alignment step mentioned above, the chuck table 51 is moved to a laser beam applying area where the focusing means 522 of the laser beam applying means 52 for applying a pulsed laser beam is positioned, thereby positioning a predetermined one of the division lines 21 directly below the focusing means 522. More specifically, as shown in FIG. 4A, one end (left end as viewed in FIG. 4A) of the predetermined division line 21 on the SAW device wafer 2 is positioned directly below the focusing means 522. Thereafter, the focal point P of the pulsed laser beam to be applied from the focusing means 522 is set near the front side 2a (upper surface) of the SAW device wafer 2. Thereafter, the pulsed laser beam is applied from the focusing means 522 of the laser beam applying means 52 to the SAW device wafer 2, and the feeding means (not shown) is operated to move the chuck table 51 in the direction shown by an arrow X1 in FIG. 4A at a predetermined feed speed (laser processed groove forming step). When the other end (right end as viewed in FIG. 4B) of the predetermined division line 21 reaches the position directly below the focusing means 522 as shown in FIG. 4B, the application of the pulsed laser beam is stopped and the movement of the chuck table 51 is also stopped. As a result, a laser processed groove 210 is formed along the predetermined division line 21 on the SAW device wafer 2 as shown in FIG. 4B.

For example, the laser processed groove forming step mentioned above is performed under the following processing conditions.

Light source: YAG laser
Wavelength: 532 nm
Repetition frequency: 50 kHz
Pulse width: 10 ps
Average power: 2 W
Focused spot diameter: ϕ15 μm
Work feed speed: 100 mm/s Under the above processing conditions, a laser processed groove having a depth of about 8 μm can be formed by once applying the pulsed laser beam along the predetermined division line 21. Accordingly, the SAW device wafer 2 can be completely cut by repeating the application of the pulsed laser beam along the predetermined division line 21 plural times. After performing the laser processed groove forming step along all of the division lines 21 extending in the first direction on the SAW device wafer 2, the chuck table 51 is rotated by 90 degrees to similarly perform the laser processed groove forming step along each of the other division lines 21 extending in the second direction perpendicular to the first direction.

There will now be examined the pulsed laser beam to be applied along the division lines 21 on the SAW device wafer 2 formed from a nonlinear crystal substrate of lithium tantalate ($LiTaO_3$) or lithium niobate ($LiNbO_3$), for example. The present inventors conducted an experiment that a pulsed laser beam was applied to a nonlinear crystal substrate of lithium tantalate ($LiTaO_3$) or lithium niobate ($LiNbO_3$), for example, having a thickness of 50 to 300 μm, thereby forming a laser processed groove on the substrate. This experiment was conducted under the conditions that the pulse width was 1 to 300 ns, the wavelength was 266 to 1064 nm, the repetition frequency was 20 to 200 kHz, and the average power was 0.5 to 4 W. As the experimental result, cracks were generated in all the cases. This result is considered to be due to the fact that the pulse width is as long as 1 to 300 ns, so that thermal energy generated in one pulse becomes large to cause the generation of cracks. Accordingly, it is necessary to suppress a temperature rise in laser processing. In suppressing a temperature rise in laser processing, the repetition frequency of the pulsed laser beam is an important factor. When the repetition frequency of the pulsed laser beam is high, the pulse spacing is short and the cooling time after application of one pulse is accordingly short, so that the thermal energy is accumulated to cause the generation of cracks. Conversely, when the repetition frequency of the pulsed laser beam is low, the pulse spacing is long and the cooling time after application of one pulse is accordingly long, so that the generation of cracks can be suppressed. However, when the repetition frequency of the pulsed laser beam is low, the cooling time after application of one pulse is long as described above, so that there is a problem that the processing efficiency is reduced to cause an increase in processing time.

Figure 5:
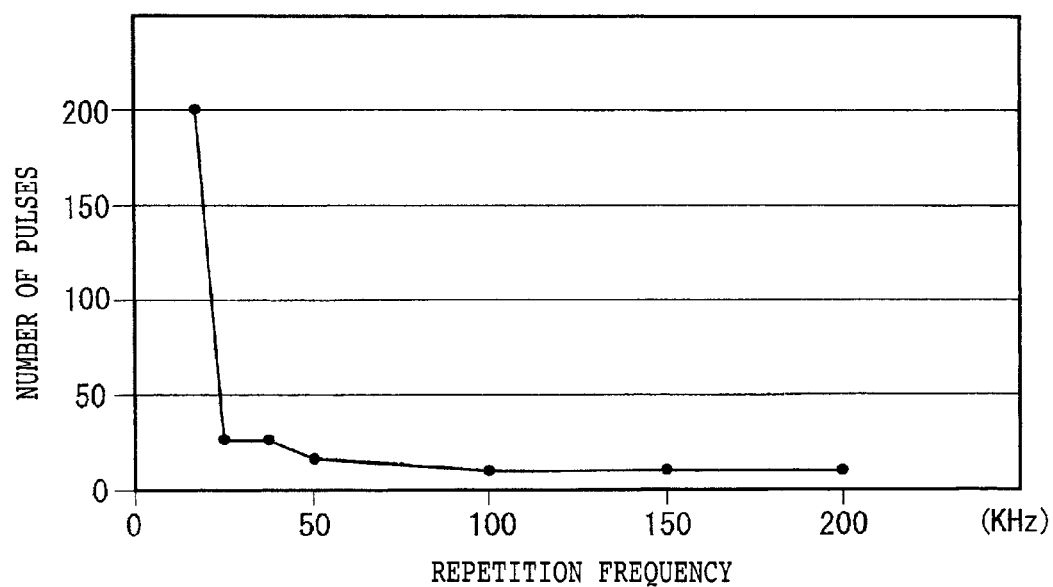
FIG. 5 is a graph showing experimental data on the number of pulses required to penetrate a lithium tantalate ($LiTaO_3$) substrate and a lithium niobate ($LiNbO_3$) substrate each having a thickness of 100 μm in applying a pulsed laser beam thereto.

FIG. 5 shows experimental results by the present inventors in the case that a pulsed laser beam was applied to a lithium tantalate ($LiTaO_3$) substrate and a lithium niobate ($LiNbO_3$) substrate each having a thickness of 100 μm and the number of pulses required to penetrate each substrate was measured. In FIG. 5, the horizontal axis represents the repetition frequency (kHz) of the pulsed laser beam applied, and the vertical axis represents the number of pulses required to penetrate each substrate. The wavelength of the pulsed laser beam applied was set to 523 nm and the average power was set to 2 W. As apparent from FIG. 5, when the repetition frequency of the pulsed laser beam is in the range of 200 to 25 kHz, the application of 20 to 30 pulses can penetrate the lithium tantalate ($LiTaO_3$) substrate and the lithium niobate ($LiNbO_3$) substrate each having a thickness of 100 μm. However, when the repetition frequency of the pulsed laser beam is 20 kHz, the application of 200 pulses is required to penetrate the lithium tantalate ($LiTaO_3$) substrate and the lithium niobate ($LiNbO_3$) substrate each having a thickness of 100 μm. On the other hand, when the repetition frequency of the pulsed laser beam is higher than 50 kHz, the generation of cracks was found. Accordingly, to process each substrate without reducing the processing efficiency and generating the cracks, the repetition frequency of the pulsed laser beam is preferably set to 25 to 50 kHz.

Example 1

A pulsed laser beam was applied to a lithium tantalate ($LiTaO_3$) substrate under the following processing conditions to form a laser processed groove.
Wavelength: 532 nm or more
Repetition frequency: 50 kHz or more
Pulse width: 200 ps or more
Average power: 0.5 to 4 W
Focused spot diameter: φ15 μm
Work feed speed: 100 mm/s In the case that the wavelength was 532 nm, the pulse width was 200 ps, and the repetition frequency was 50 kHz in the above experiment, no cracks were found at any average power in the above range. However, when the wavelength was changed to 600 nm or more, cracks were generated. Further, when the repetition frequency was changed to 60 kHz or more, cracks were generated. Further, when the pulse width was changed to 250 ps or more, cracks were generated.

Example 2

A pulsed laser beam was applied to a lithium niobate ($LiNbO_3$) substrate under the following processing conditions to form a laser processed groove.
Wavelength: 532 nm or more
Repetition frequency: 70 kHz or more
Pulse width: 200 ps or more
Average power: 0.5 to 4 W
Focused spot diameter: φ15 μm
Work feed speed: 100 mm/s In the case that the wavelength was 532 nm, the pulse width was 200 ps, and the repetition frequency was 70 kHz in the above experiment, no cracks were found at any average power in the above range. However, when the wavelength was changed to 600 nm or more, cracks were generated. Further, when the repetition frequency was changed to 100 kHz or more, cracks were generated. Further, when the pulse width was changed to 250 ps or more, cracks were generated.

In comprehensively considering the above experimental results, it is important that the pulse width of the pulsed laser beam to be applied must be set to 200 ps or less and the repetition frequency of the pulsed laser beam to be applied must be set to 50 kHz or less in order to form a laser processed groove on a nonlinear crystal substrate of lithium tantalate ($LiTaO_3$) or lithium niobate ($LiNbO_3$) without generating the cracks. Further, the wavelength of the pulsed laser beam to be applied is preferably set to 550 nm or less. Further, the repetition frequency of the pulsed laser beam to be applied is preferably set to 25 to 50 kHz in order to process the substrate without reducing the processing efficiency and generating the cracks.

After performing the laser processed groove forming step mentioned above, a pickup step is performed in the following manner. In the case that the SAW device wafer 2 is not completely cut along the division lines 21 where the laser processed grooves 210 are formed, the adhesive tape 4 is expanded to thereby break the SAW device wafer 2 along the laser processed grooves 210, thereby dividing the SAW device wafer 2 into the individual SAW devices 22. Further, in the case that the SAW device wafer 2 is completely cut along the division lines 21 where the laser processed grooves 210 are formed, so that the SAW device wafer 2 is divided into the individual SAW devices 22, the adhesive tape 4 is expanded to increase the spacing between any adjacent ones of the SAW devices 22. Thereafter, the individual SAW devices 22 are picked up from the adhesive tape 4. This pickup step is performed by using a pickup apparatus 6 shown in FIG. 6.

Figure 6:
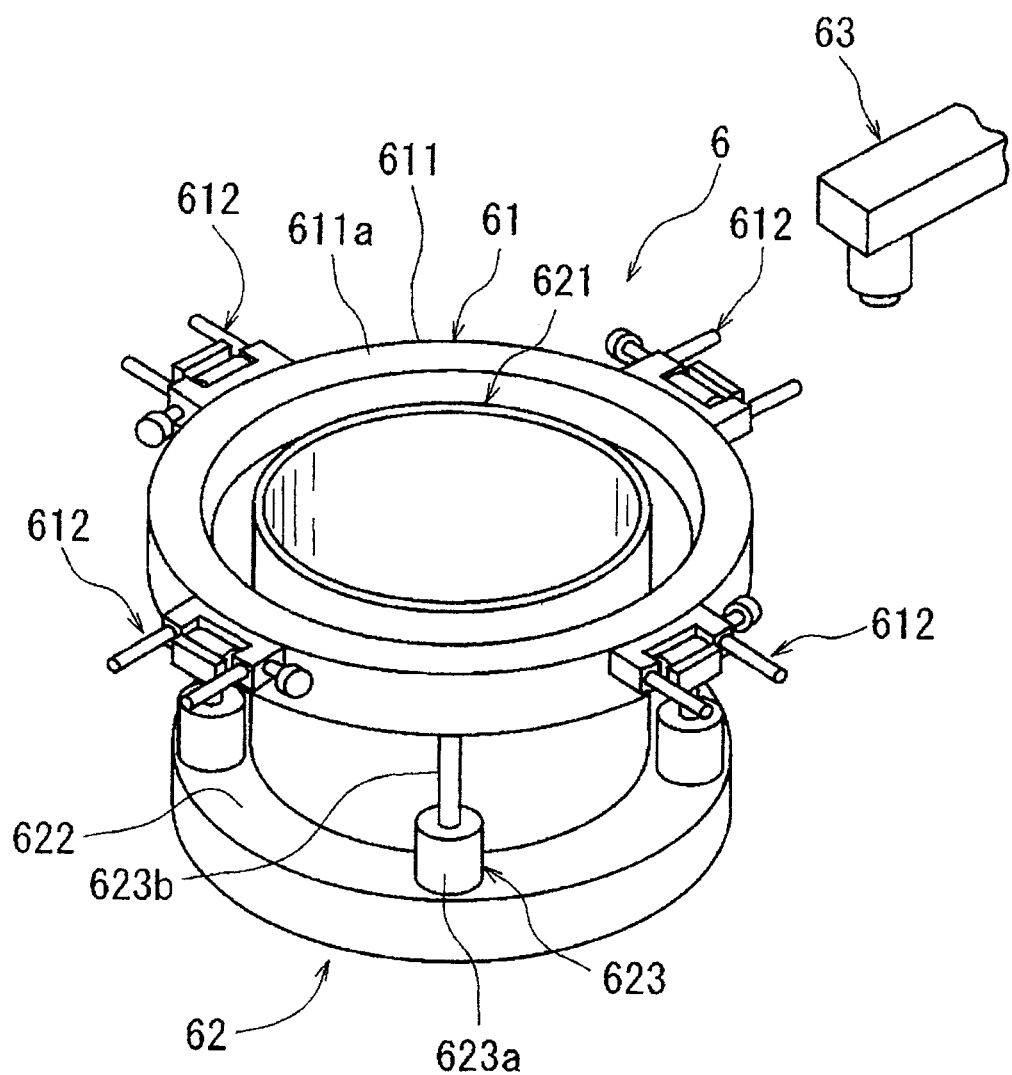
FIG. 6 is a perspective view of a pickup apparatus for performing a pickup step in the laser processing method for the nonlinear crystal substrate according to the present invention.

The pickup apparatus 6 shown in FIG. 6 includes frame holding means 61 for holding the annular frame 3, tape expanding means 62 for expanding the adhesive tape 4 supported to the annular frame 3 held by the frame holding means 61, and a pickup collet 63. The frame holding means 61 includes an annular frame holding member 611 and a plurality of clamps 612 as fixing means provided on the outer circumference of the frame holding member 611. The upper surface of the frame holding member 611 functions as a mounting surface 611a for mounting the annular frame 3 thereon. The annular frame 3 mounted on the mounting surface 611a is fixed to the frame holding member 611 by the clamps 612. The frame holding means 61 is supported by the tape expanding means 62 so as to be vertically movable.

Figure 7A:
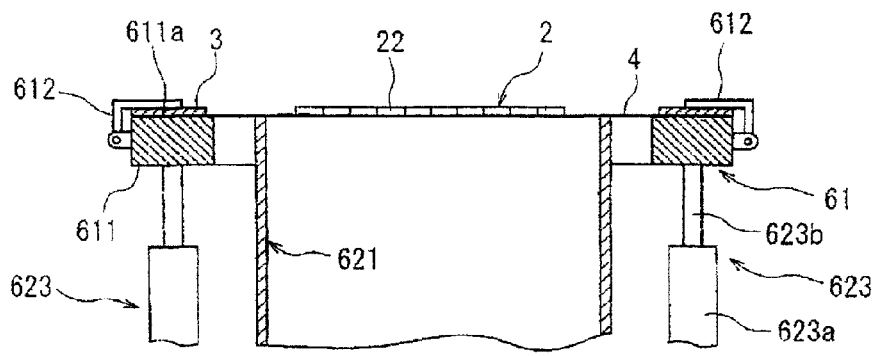
FIGS. 7A to 7C are sectional side views for illustrating the pickup step in the laser processing method for the nonlinear crystal substrate according to the present invention.
Figure 7B:
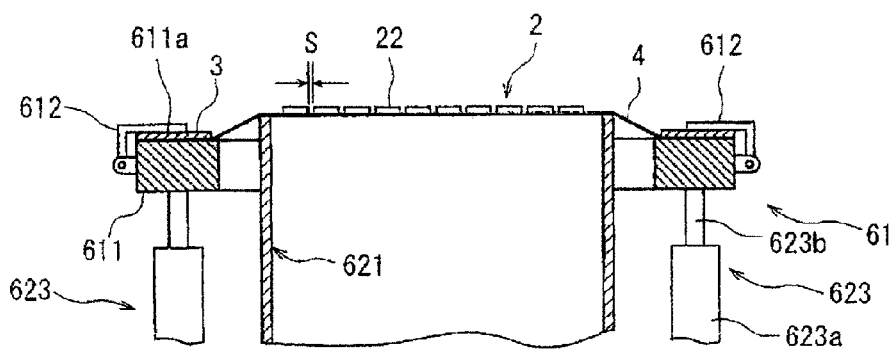

The tape expanding means 62 includes an expanding drum 621 provided inside of the annular frame holding member 611. The expanding drum 621 has an outer diameter smaller than the inner diameter of the annular frame 3 and an inner diameter larger than the outer diameter of the SAW device wafer 2 attached to the adhesive tape 4 supported to the annular frame 3. The expanding drum 621 has a supporting flange 622 at the lower end of the drum 621. The tape expanding means 62 further includes supporting means 623 for vertically movably supporting the annular frame holding member 611. The supporting means 623 is composed of a plurality of air cylinders 623a provided on the supporting flange 622. Each air cylinder 623a is provided with a piston rod 623b connected to the lower surface of the annular frame holding member 611. The supporting means 623 composed of these plural air cylinders 623a functions to vertically move the annular frame holding member 611 so as to selectively take a reference position where the mounting surface 611a is substantially equal in height to the upper end of the expanding drum 621 as shown in FIG. 7A and an expansion position where the mounting surface 611a is lower in height than the upper end of the expanding drum 621 by a predetermined amount as shown in FIG. 7B.

Figure 7C:
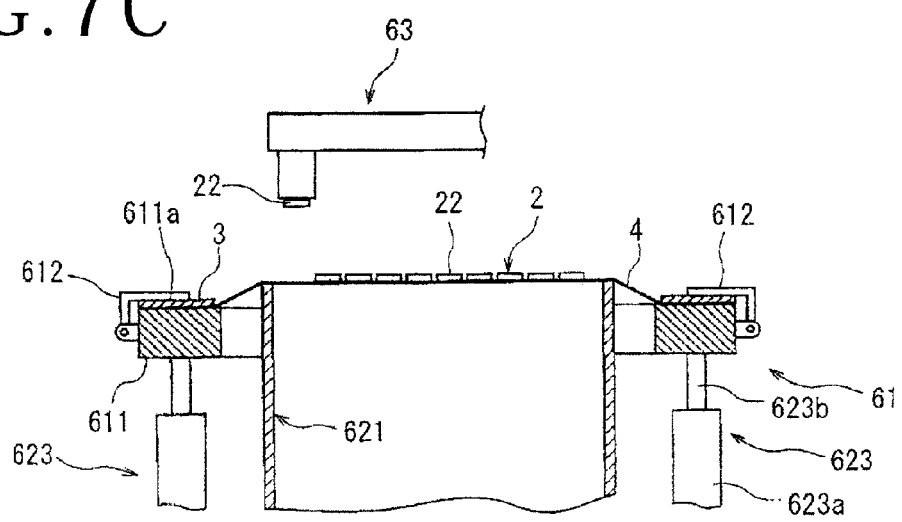

The pickup step using the pickup apparatus 6 will now be described with reference to FIGS. 7A to 7C. As shown in FIG. 7A, the annular frame 3 supporting the SAW device wafer 2 through the adhesive tape 4 is mounted on the mounting surface 611a of the frame holding member 611 of the frame holding means 61 and fixed to the frame holding member 611 by the clamps 612 (frame holding step). At this time, the frame holding member 611 is set at the reference position shown in FIG. 7A. Thereafter, the air cylinders 623a as the supporting means 623 of the tape expanding means 62 are operated to lower the frame holding member 611 to the expansion position shown in FIG. 7B. Accordingly, the annular frame 3 fixed to the mounting surface 611a of the frame holding member 611 is also lowered, so that the adhesive tape 4 supported to the annular frame 3 comes into abutment against the upper end of the expanding drum 621 and is expanded as shown in FIG. 7B (tape expanding step).

As a result, a tensile force acts on the SAW device wafer 2 attached to the adhesive tape 4 in the radial direction of the SAW device wafer 2. In the case that the SAW device wafer 2 is not completely cut along the division lines 21 where the laser processed grooves 210 are formed, the SAW device wafer 2 is broken along the laser processed grooves 210, thereby dividing the SAW device wafer 2 into the individual SAW devices 22. At the same time, a spacing S is formed between any adjacent ones of the SAW devices 22 as shown in FIG. 7B. On the other hand, in the case that the SAW device wafer 2 is completely cut along the division lines 21 where the laser processed grooves 210 are formed, so that the SAW device wafer 2 is divided into the individual SAW devices 22, the spacing S between any adjacent ones of the SAW devices 22 is increased. Thereafter, the pickup collet 63 is operated to hold each SAW device 22 under suction and peel it off from the adhesive tape 4, thus individually picking up the SAW devices 22 as shown in FIG. 7C. Thereafter, each SAW device 22 is transported to a tray (not shown) or to a position where a die bonding step is performed. In this pickup step, the spacing S between any adjacent ones of the individual SAW devices 22 attached to the adhesive tape 4 is increased, so that each SAW device 22 can be easily picked up without the contact with its adjacent SAW device 22.

The adhesive tape 4 is not cut in the laser processed groove forming step, so that the adhesive tape 4 is not broken in the pickup step, but the spacing S can be increased by the expansion of the adhesive tape 4. Accordingly, each SAW device 22 can be easily picked up without the contact with its adjacent SAW device 22.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing method for a nonlinear crystal substrate having a plurality of crossing division lines, comprising:
    a step of applying a pulsed laser beam to a work surface of said nonlinear crystal substrate along said division lines to thereby cut a plurality of laser processed grooves into said work surface along said division lines,
    wherein a pulse width of said pulsed laser beam is set to be greater than zero and less than or equal to 200 ps and a repetition frequency of said pulsed laser beam is set to between 25 kHz and 50 kHz.

2. The laser processing method according to claim 1, wherein a wavelength of said pulsed laser beam is set to be greater than zero and less than or equal to 550 nm.

3. The laser processing method according to claim 1, wherein said step of applying a pulsed laser beam to the work surface of said nonlinear crystal substrate results in a groove of a depth of approximately 8 µm.

4. The laser processing method according to claim 2, wherein said step of applying a pulsed laser beam to the work surface of said nonlinear crystal substrate results in a groove of a depth of approximately 8 µm.

5. The laser processing method according to claim 1, wherein said step of applying a pulsed laser beam to the work surface of said nonlinear crystal substrate is performed a plurality of times until said nonlinear crystal substrate is cut completely through.

6. The laser processing method according to claim 2, wherein said step of applying a pulsed laser beam to the work surface of said nonlinear crystal substrate is performed a plurality of times until said nonlinear crystal substrate is cut completely through.

7. The laser processing method according to claim 1, wherein said pulsed laser beam has a focused spot diameter of approximately 15 µm.

8. The laser processing method according to claim 2, wherein said pulsed laser beam has a focused spot diameter of approximately 15 µm.

9. The laser processing method according to claim 1, wherein the repetition frequency of said pulsed laser beam is greater than or equal to 25 kHz and is less than 40 kHz.

10. The laser processing method according to claim 2, wherein the repetition frequency of said pulsed laser beam is greater than or equal to 25 kHz and is less than 40 kHz.

11. The laser processing method according to claim 1, wherein the repetition frequency of said pulsed laser beam is greater than or equal to 25 kHz and is less than 35 kHz.

12. The laser processing method according to claim 2, wherein the repetition frequency of said pulsed laser beam is greater than or equal to 25 kHz and is less than 35 kHz.

13. The laser processing method according to claim 1, wherein said nonlinear crystal substrate is formed of either lithium tantalite or lithium niobate.

14. The laser processing method according to claim 2, wherein said nonlinear crystal substrate is formed of either lithium tantalite or lithium niobate.

* * * * *